(12) United States Patent
Gebauer et al.

(10) Patent No.: US 9,210,307 B2
(45) Date of Patent: Dec. 8, 2015

(54) VEHICULAR CAMERA SYSTEM WITH REDUCED NUMBER OF PINS AND CONDUITS

(75) Inventors: Duane W. Gebauer, Gregory, MI (US); Nazar F. Bally, Sterling Heights, MI (US); Brett Harris, Lapeer, MI (US); Richard D. Shriner, Grand Blanc, MI (US)

(73) Assignee: MAGNA ELECTRONICS, INC., Auburn Hills, MI (US)

( * ) Notice: Subject to any disclaimer, the term of this patent is extended or adjusted under 35 U.S.C. 154(b) by 396 days.

(21) Appl. No.: 13/883,370

(22) PCT Filed: Nov. 3, 2011

(86) PCT No.: PCT/US2011/059089
§ 371 (c)(1),
(2), (4) Date: May 3, 2013

(87) PCT Pub. No.: WO2012/061567
PCT Pub. Date: May 10, 2012

(65) Prior Publication Data
US 2013/0222595 A1    Aug. 29, 2013

Related U.S. Application Data

(60) Provisional application No. 61/410,132, filed on Nov. 4, 2010, provisional application No. 61/490,195, filed on May 26, 2011.

(51) Int. Cl.
| H04N 5/225 | (2006.01) |
| H04N 5/232 | (2006.01) |
| H04N 5/217 | (2011.01) |

(52) U.S. Cl.
CPC ............. *H04N 5/2252* (2013.01); *H04N 5/217* (2013.01); *H04N 5/2251* (2013.01); *H04N 5/232* (2013.01)

(58) Field of Classification Search
CPC .......... H04N 1/00557; H04N 1/00907; H04N 2201/0034; H04N 2201/48; H04N 2201/0049; H04N 2201/0063; H04N 2201/00541; H01R 2201/18
USPC .................................................. 348/373, 374
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

WO    WO2010110957    9/2010

OTHER PUBLICATIONS

International Search Report and Written Opinion dated Feb. 9, 2012 for corresponding PCT Application No. PCT/US2011/059089.

*Primary Examiner* — Nelson D. Hernández Hernández
(74) *Attorney, Agent, or Firm* — Gardner, Linn, Burkhart & Flory, LLP

(57) ABSTRACT

A camera assembly for a vehicle includes an end connector with a first connection point that carries a video+signal, a second connection point that carries power, and a third connection point that receives a video−signal, video shield current and ground current. The camera assembly may connect to a conduit assembly of the vehicle that includes a first conduit that carries the video+signal from the end connector to a display in the vehicle, a second conduit that carries power from a power source (such as a battery) to the camera assembly, and a third conduit that connects between the third connection point and a ground point for the display in the vehicle. The camera may include a radio frequency identification element operable to wirelessly communicate between a remote device and the camera to identify the camera module and/or to program the camera.

19 Claims, 9 Drawing Sheets

(56) References Cited

U.S. PATENT DOCUMENTS

| | | | |
|---|---|---|---|
| 5,949,331 | A | 9/1999 | Schofield et al. |
| 6,222,447 | B1 | 4/2001 | Schofield et al. |
| 6,498,620 | B2 | 12/2002 | Schofield et al. |
| 6,605,775 | B1 | 8/2003 | Seeber et al. |
| 6,611,202 | B2 | 8/2003 | Schofield et al. |
| 6,636,258 | B2 | 10/2003 | Strumolo et al. |
| 7,145,519 | B2 | 12/2006 | Takahashi et al. |
| 7,161,616 | B1 | 1/2007 | Okamoto et al. |
| 7,230,640 | B2 | 6/2007 | Regensburger et al. |
| 7,248,283 | B2 | 7/2007 | Takagi et al. |
| 7,295,229 | B2 | 11/2007 | Kumata et al. |
| 7,301,466 | B2 | 11/2007 | Asai |
| 7,381,089 | B2 | 6/2008 | Hosler, Sr. |
| 7,492,262 | B2 | 2/2009 | Washington |
| 7,592,928 | B2 | 9/2009 | Chinomi et al. |
| 7,859,565 | B2 | 12/2010 | Schofield et al. |
| 9,041,806 | B2 | 5/2015 | Baur et al. |
| 2006/0212624 | A1 | 9/2006 | Kim |
| 2006/0254805 | A1 | 11/2006 | Scherer et al. |
| 2007/0103313 | A1* | 5/2007 | Washington ............... 340/572.8 |
| 2010/0097519 | A1* | 4/2010 | Byrne et al. .................. 348/373 |
| 2010/0118145 | A1 | 5/2010 | Betham et al. |
| 2012/0062743 | A1 | 3/2012 | Lynam et al. |
| 2012/0154591 | A1 | 6/2012 | Baur et al. |
| 2014/0022390 | A1 | 1/2014 | Blank et al. |

* cited by examiner

VEHICULAR CAMERA SYSTEM WITH REDUCED NUMBER OF PINS AND CONDUITS

CROSS REFERENCE TO RELATED APPLICATIONS

The present application is a 371 national phase application of PCT Application No. PCT/US2011/059089, filed Nov. 3, 2011, which claims the priority benefit of U.S. provisional applications, Ser. No. 61/490,195, filed May 26, 2011, and Ser. No. 61/410,132, filed Nov. 4, 2010, which are hereby incorporated herein by reference in their entireties.

FIELD OF THE INVENTION

The present invention relates to vehicular camera systems, and more particularly to single ended, NTSC vehicular camera systems.

BACKGROUND OF THE INVENTION

Vehicular cameras typically include connectors with 6 pins that are used to connect to the rest of the vehicle. As a result, the connector directly impacts the size of the camera, the number of components in the camera, and the cost of the camera. Additionally, the wiring that extends from the connector to points in the vehicle such as a display in the instrument panel and a vehicle ground adds to the overall cost associated with the camera. Examples of vehicular vision systems that incorporate cameras are described in U.S. Pat. Nos. 7,859,565; 6,611,202; 6,222,447; 5,949,331; 5,670,935; and/or 5,550,677, which are hereby incorporated herein by reference in their entireties.

There is a continuing need for vehicular cameras that are smaller and less expensive without sacrificing performance.

SUMMARY OF THE INVENTION

In one aspect, the invention is directed to a camera assembly for a vehicle, wherein the camera assembly has an end connector with a first connection point that carries a video+ signal, a second connection point that carries power, and a third connection point that receives a video−signal, video shield current and ground current. The camera assembly may connect to a vehicle conduit assembly for the vehicle. The vehicle conduit assembly includes a first conduit that carries the video+signal from the end connector to a display in the vehicle, a second conduit that carries power from a power source (such as a battery) to the camera assembly, and a third conduit that connects between the third connection point and a ground point for the display in the vehicle.

According to another aspect of the present invention, a vehicular camera, such as for a vision display system for a vehicle, such as a rearward facing camera for a rear backup assist system of the vehicle, includes a wireless communication device or receiver or transceiver, such as a radio frequency identification (RFID) chip or device or the like, that is operable to wirelessly communicate with a remote device and to communicate with the camera circuitry to provide a wireless interface between the remote device and the camera circuitry. The vision system is operable to at least one of (a) identify the camera module via the wireless communication, and (b) program the camera circuitry via the wireless communication.

BRIEF DESCRIPTION OF THE DRAWINGS

The present invention will now be described by way of example only with reference to the attached drawings, in which.

DESCRIPTION OF THE PREFERRED EMBODIMENTS

Figure 1:
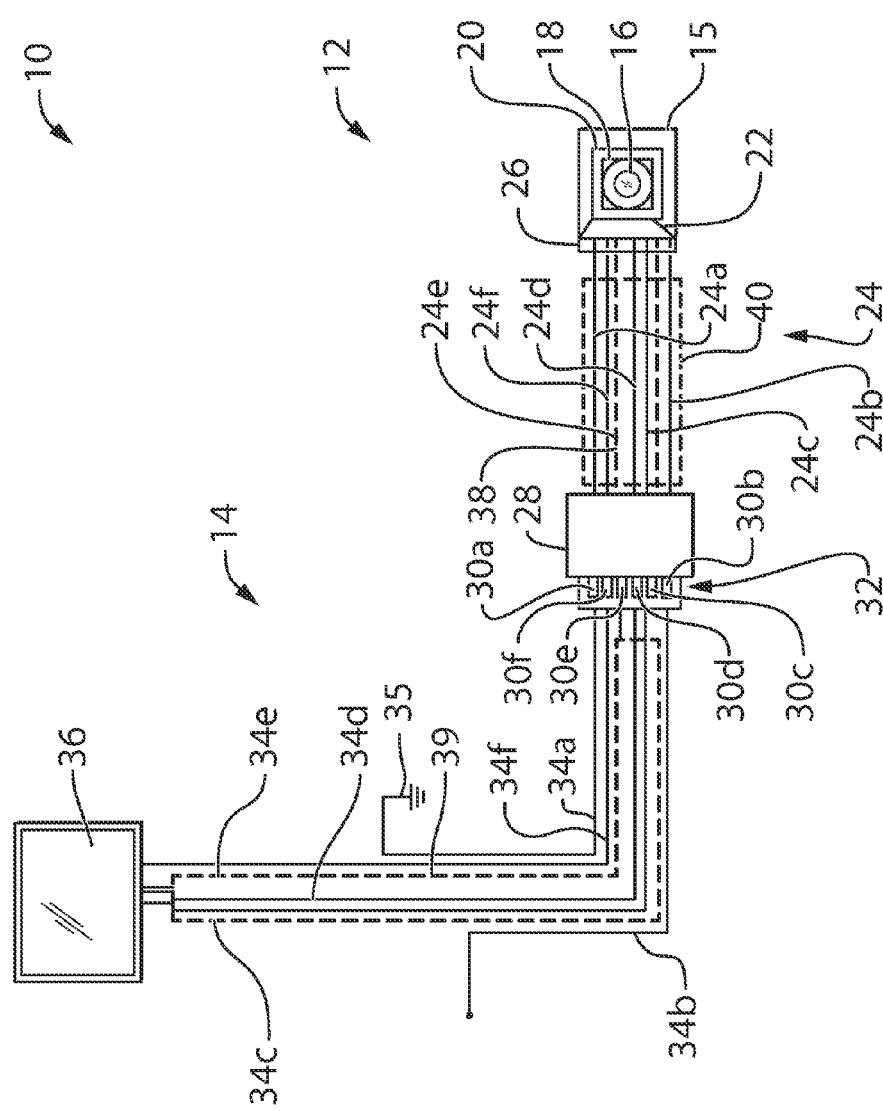
FIG. 1 is a schematic illustration of a camera system including a camera assembly and a vehicle conduit assembly, in accordance with the prior art.

Reference is made to FIG. 1, which shows a vehicular camera system 10 in accordance with the prior art. The vehicular camera system 10 includes a vehicle camera assembly 12 and a vehicle conduit assembly 14 connecting the camera assembly 12 to several points in a vehicle. The vehicle camera assembly 12 includes a housing 15, a lens 16, an imager 18, a printed circuit board 20, a printed circuit board connector 22 on the printed circuit board 20, a set of conduits 24 with an intermediate connector 26 at a first end for connecting to the printed circuit board connector 22 and with an end connector 28 at a second end for connecting to the vehicle conduit assembly 14. Each of the connectors 22, 26 and 28 in the camera assembly 12 has 6 connection points (i.e. pins or receptacles), including: ground 30a, power 30b, video+30c, video−30d, video shield 30e, and an optional communication connection point 30f for connecting to a bus such as a CAN bus or a LIN bus.

The conduits 24 corresponding to video+ and video−, shown at 24c and 24d are wrapped in a first, inner shield, which is the video shield 24e, which may be in the form of a conductive foil shown at 38, and the conduits 24 corresponding to power, ground and communication, shown at 24b, 24a and 24f respectively, extend alongside the inner shield 24e. An outer shield 40 extends around the conduits 24a, 24b, 24c, 24d, 24e and 24f, and is sealed to the camera housing 15 to prevent moisture from entering the camera housing 15.

The vehicle conduit assembly 14 includes a vehicle connector 32 which connects to the end connector 28 of the camera assembly 12 and a plurality of conduits 34 that extend between the connector 32 and several points within the vehicle. The conduits 34 include: ground 34a, power 34b, video+34c, video−34d, video shield 34e, and an optional communication conduit 34f.

The ground conduit 34a is connected to vehicle ground shown at 35. The power conduit 34b is connected to a power source, such as the vehicle battery (not shown).

The video+ and video−conduits 34c and 34d are connected to a vehicle display shown at 36, which may be anywhere suitable, such as on the instrument panel (not shown). The video+ and video−conduits 34c and 34d may be in the form of a twisted pair which has the video shield conduit 34e wrapped around it. In embodiments wherein the camera assembly 12 is a rear view camera, it will be noted that these conduits 34c, 34d and 34e may extend along a significant portion of the length of the vehicle, (i.e. from the rear of the vehicle to the display which is typically at the front of the passenger cabin).

Providing the video+ and video−conduits 34c and 34d as a twisted pair is intended to provide immunity against coupled noise, and also to maintain constant impedance. The video shield conduit 34e is in the form of a conductive foil strip 39 which provides additional immunity against coupled noise. Typically, the video shield conduit 34e is connected to ground only at one end so as to avoid ground loops. However, it has been found that grounding the conduit 34e at only one end increases the impedance in the twisted pair as compared to grounding at both ends of the ground conduit 34a. This increased impedance that results when the shield is grounded only at one end reduces the signal level being sent from the camera assembly 12 to the display 36.

The communication conduit 34f extends between the vehicle connector 32 and the display 36 in certain applications, such as when dynamic overlays are applied by the camera assembly 12 onto the images sent to the display 36.

Figure 2:
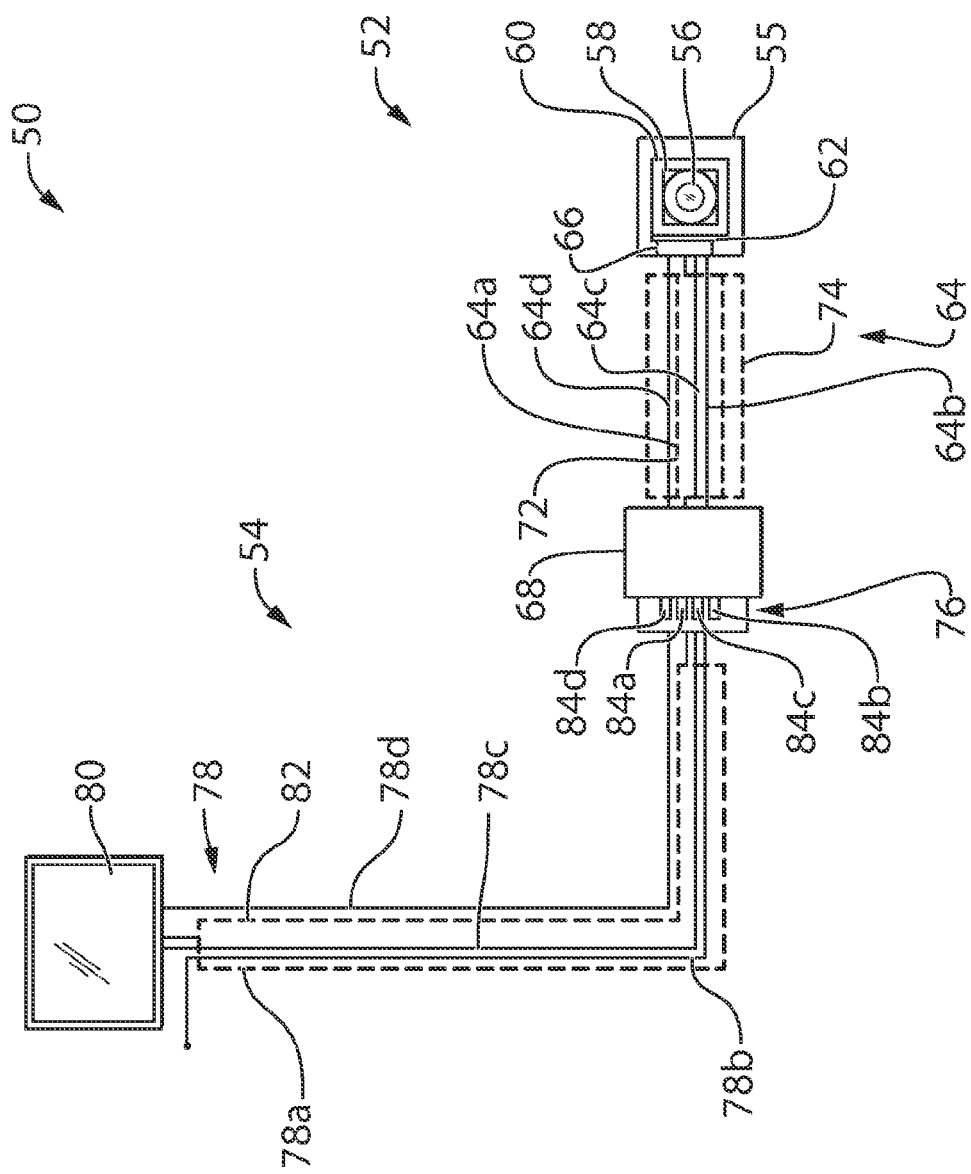
FIG. 2 is a schematic illustration of a camera system including a camera assembly and a vehicle conduit assembly, in accordance with an embodiment of the present invention.

Reference is made to FIG. 2, which shows a camera system 50 in accordance with an embodiment of the present invention. The camera system 50 includes a camera assembly 52 and a vehicle conduit assembly 54. The camera assembly 52 includes a housing 55, a lens 56, an imager 58, a printed circuit board 60 with a printed circuit board connector 62 thereon, a set of conduits 64 with an intermediate connector 66 at a first end for connecting to the printed circuit board connector 62 and an end connector 68 at a second end for connecting to the vehicle conduit assembly 54. Each of the connectors 62, 66 and 68 in the camera assembly 52 has 4 connection points (i.e. pins or receptacles), including: The conduits 64 include a shield/ground/video−connection point 84a, a power connection point 64b, a video+connection point 64c, and an optional communication connection point 64d for connecting to a bus such as a CAN bus or a LIN bus.

The conduits 64 include a shield/ground/video−conduit 64a, a power conduit 64b, a video+conduit 64c, and an optional communication conduit 64d. The shield/ground/video−conduit 64a is wrapped around the video+ and power conduits 64c and 64b, and is in the form of a conductive foil strip 72. An outer shield 74 extends around the communication conduit 64d and the conduits 64a, 64b and 64c and forms a seal with the camera housing 55 so as to prevent moisture from entering the camera housing 55.

The vehicle conduit assembly 54 includes a vehicle connector 76 which connects to the end connector 68 of the camera assembly 52 and a plurality of conduits 78 that extend between the connector 76 and two points within the vehicle. The conduits 78 include: a shield/ground/video−conduit 78a, a power conduit 78b, a video+conduit 78c, and an optional communication conduit 78d.

The shield/ground/video−conduit 78a and the video+conduit 78c connect to the display shown at 80 which may be positioned anywhere suitable, such as on the vehicle's instrument panel (not shown). The power conduit 78b is connected to a power source, such as the vehicle battery (not shown). It may, for example, be connected through the ignition system so that power is sent to the camera assembly 52 upon startup of the vehicle.

Figure 7:
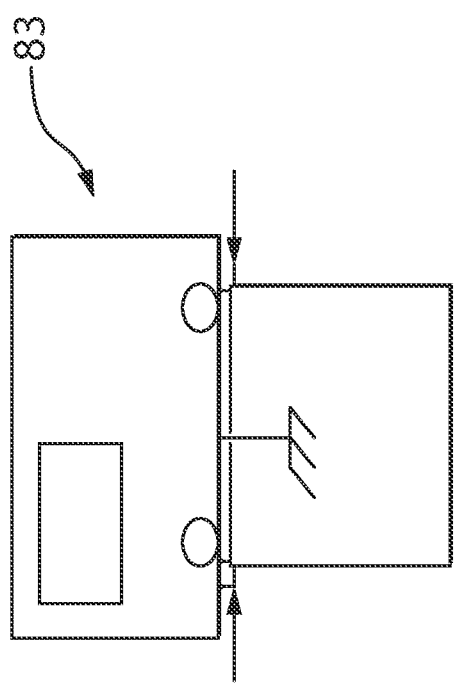
FIG. 7 is a schematic illustration of a test apparatus used to measure the impedance associated with the camera system.

The shield/ground/video−conduit 78a may be wrapped around the power conduit 78b and the video+conduit 78c along the portions of their length wherein they are adjacent one another in the vehicle. The shield/ground/video−conduit 78a may be in the form of a conductive foil strip shown at 82. The shield/ground/video−conduit 78a is preferably grounded at one end which is at the display 80. Surprisingly, this has been found to reduce the impedance in the video+conduit 78c as compared to grounding at one end of the video shield conduit 34e in the camera system 10 shown in FIG. 1. Impedance measurements were taken using the test apparatus shown at 83 in FIG. 7, which is an Agilent N3383A Network Analyzer, made by Agilent Technologies of Santa Clara, Calif., USA.

Figure 3:
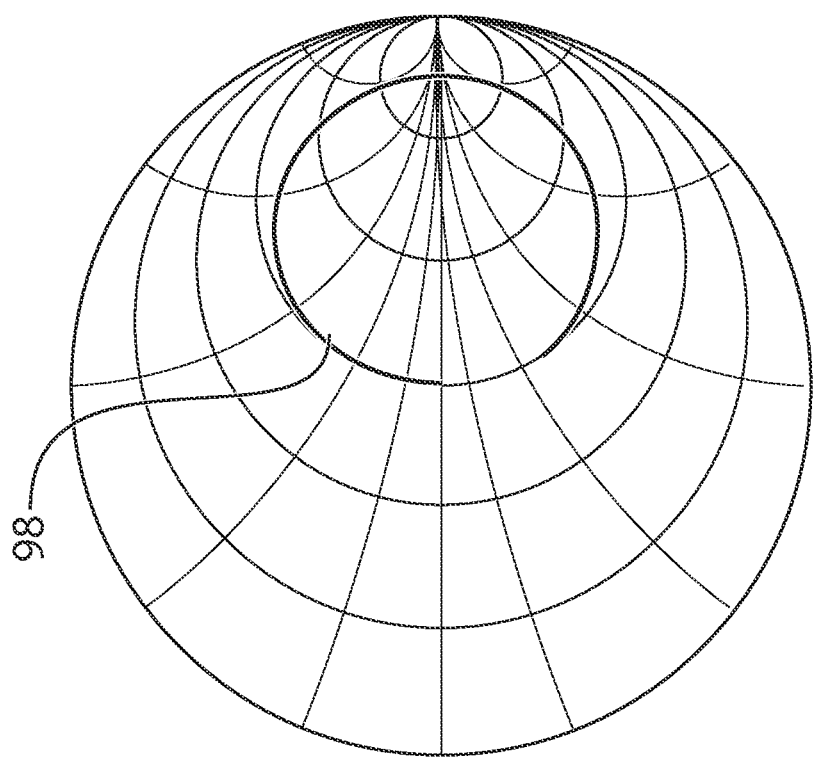
FIG. 3 is a graph illustrating the impedance of video signal conduits which connect a camera assembly shown in FIG. 1 to a display, over a range of frequencies, wherein a shield for the video signal conduits is grounded at only one end.
Figure 4:
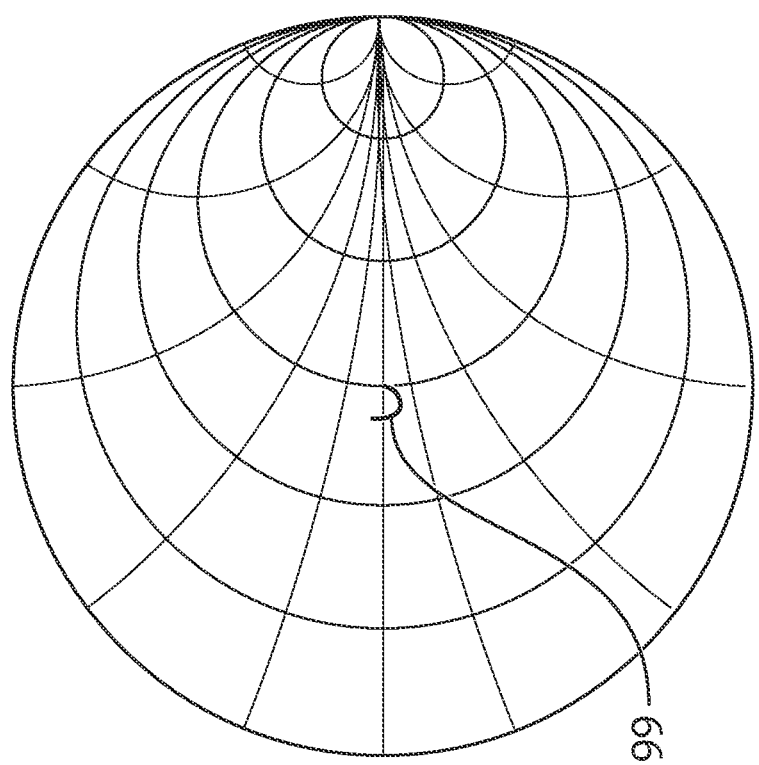
FIG. 4 is a graph illustrating the impedance of a video signal conduit which connects the camera assembly shown in FIG. 2 to a display, over a range of frequencies, wherein a shield for the video signal conduit is grounded at both ends.

The graphs shown in FIGS. 3 and 4 show the variation in impedance over a range of frequencies, for the camera system shown in FIG. 1, with a twisted pair (video+34c and video−34d) with a shield (34e) that is grounded at one end (FIG. 3), and for the camera system shown in FIG. 2, with the video+ (78c) and power (78b) with shield/ground/video−(78a) that is grounded at both ends (FIG. 4). The impedance curves are shown at 98 in FIGS. 3 and 99 in FIG. 4. As shown in the graphs, the curve 99 (for the system shown in FIG. 2) is much tighter (which implies a lower range of impedance) than the curve 98 (for the system shown in FIG. 1). The frequency ranges tested were from 300 kHz to 20 MHz.

Figure 5:
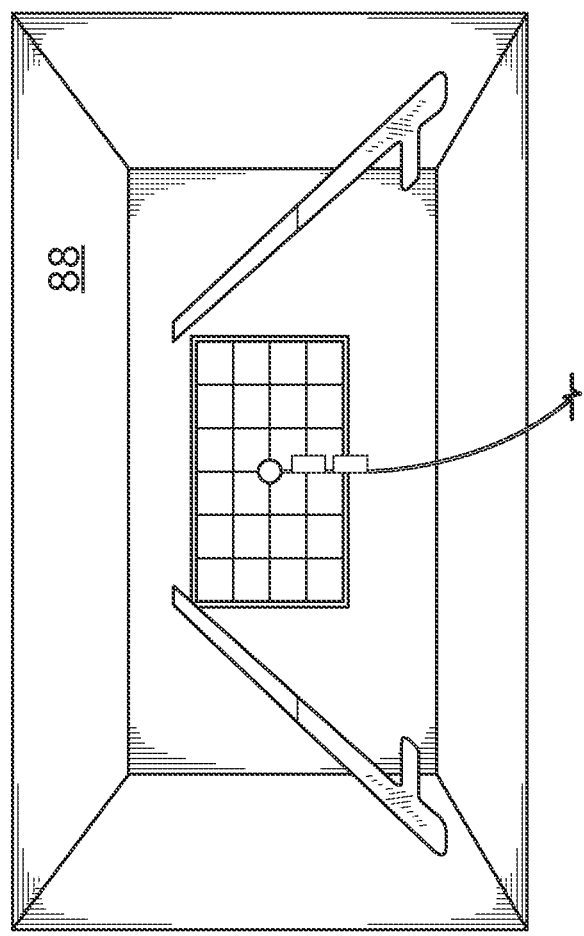
FIG. 5 is an image shown on a display using the camera system shown in FIG. 1.
Figure 6:
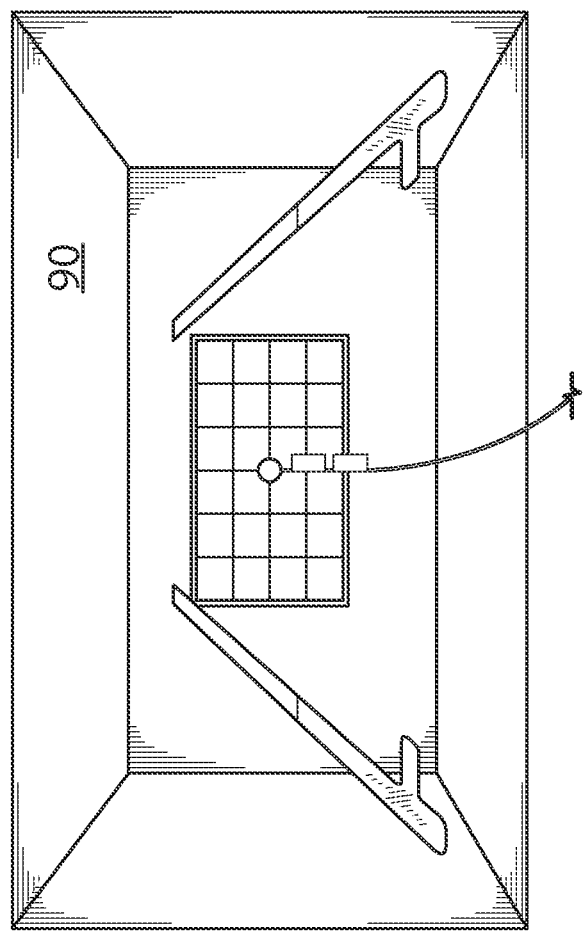
FIG. 6 is an image shown on a display using the camera system shown in FIG. 2.

Additionally, it was found that tying video− to the video shield conduit and to the ground conduit (thereby forming the shield/ground/video−conduit 78a) causes no degradation of the video signal sent from the camera 52 to the display 80. This is illustrated by the test images shown at 88 and 90 in FIGS. 5 and 6 respectively. The test images 88 was formed using the arrangement shown in FIG. 1, while the test image 90 was formed using the arrangement shown in FIG. 2. It was found that there was no difference in the quality of the images produced using the system 50 of FIG. 2, as compared to the images produced using the system 10 of FIG. 1.

EMC (electromagnetic compatibility) testing was carried out, both for radiated emissions and for conducted emissions, for the camera assemblies 12 (FIG. 1) and 52 (FIG. 2). It was found that there was no degradation in the performance of the camera assembly 52 in terms of EMC protection, as compared to the camera assembly 12. Testing showed that the performance in conducted emissions testing for the camera assembly 52 was similar to that of the camera 12, and that performance in radiated emissions was superior for the camera assembly 52 as compared to the camera assembly 12.

The communication conduit 78d, which extends between the vehicle connector 76 and the display 80, may be used in embodiments wherein certain features are to be provided, such as dynamic overlays, on the camera 52.

Many advantages arise from the camera system 50 as compared to the camera system 10. One such advantage is that the connectors 62, 66 and 68 (and the vehicle connector 76 are all smaller than their counterparts in the camera system 10. As a result, the overall size of the camera assembly 52 could be made smaller than the size of the camera assembly 12. Reduction in size of the camera assembly 50 is particularly advantageous so that it facilitates integration of the camera assembly into the vehicle structure with greater freedom and reduced footprint. Furthermore, the camera assembly 50 has a greater (in certain respects) EMC performance than the camera assembly 10. Furthermore, the amount of conduit that extends in the camera assembly and from the camera assembly through the vehicle is reduced. Furthermore, several components can be removed from the printed circuit board, including, for example, at least one common-mode choke that is provided between the video+ and video−conduits on some cameras of the prior art. Several of these benefits result in a camera assembly that is less expensive and simpler than some prior art camera systems. It will be noted that these advantages are achieved with no reduction in image quality.

The camera system 50 is a single ended system. In other words, video signals are only carried on the video+conduit.

Figure 8:
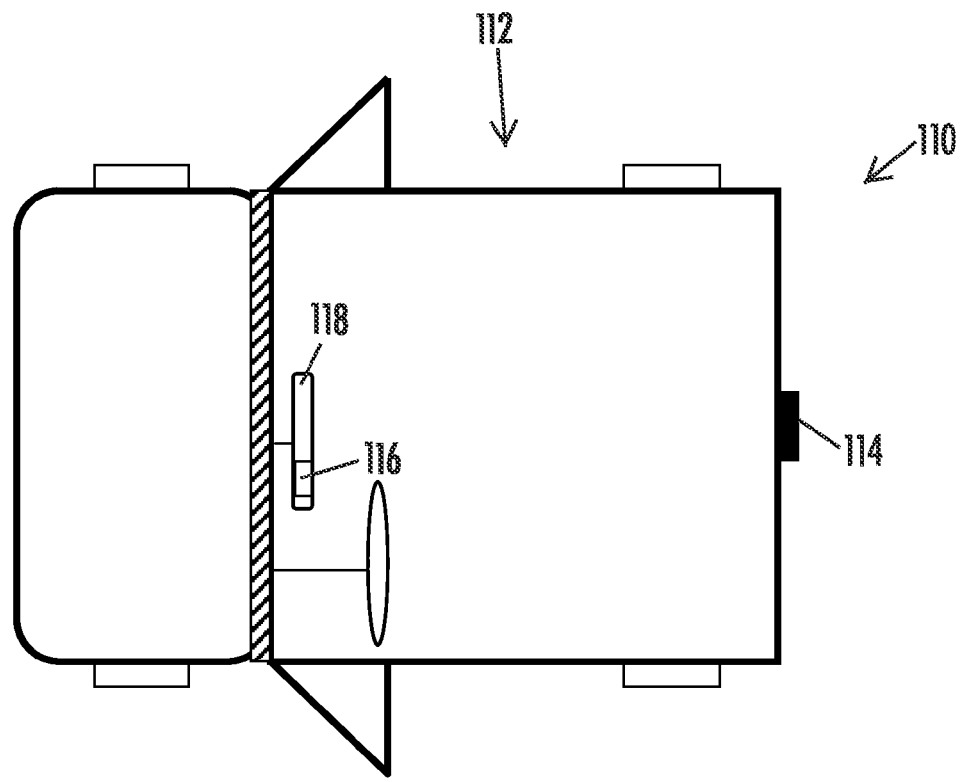
FIG. 8 is a plan view of a vehicle with a rear vision display system and a camera with an exterior rearward field of view.
Figure 9:
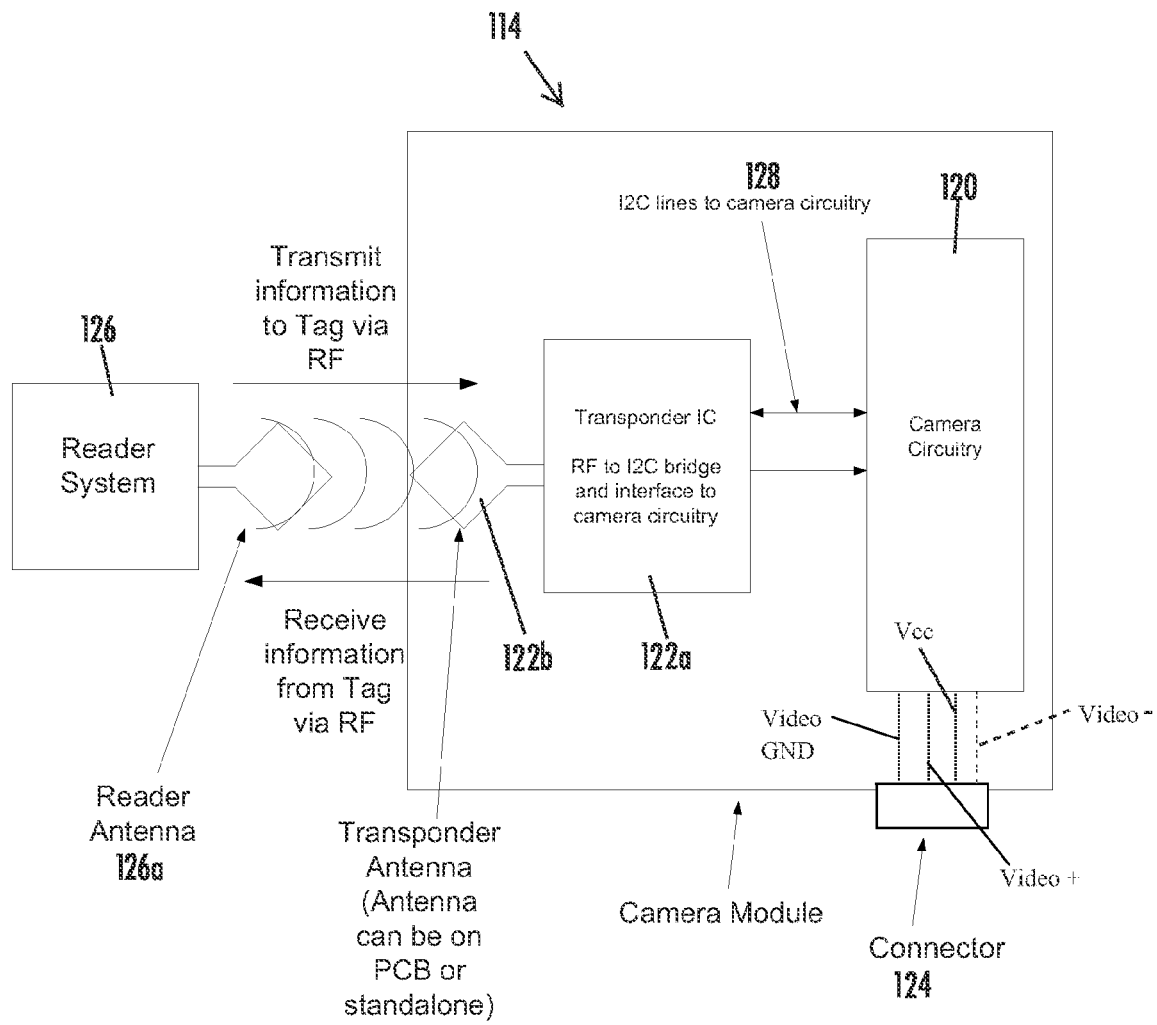
FIG. 9 is a block diagram of a camera and communication system in accordance with the present invention.

Optionally, the present invention may provide a rear vision display system that is operable to display, such as during a reversing maneuver of the vehicle, rearward video images at a video display screen disposed at or in an interior rearview mirror assembly of the vehicle. Referring now to FIG. 8, a vision display system 110 for a vehicle 112 includes a rearward facing camera module 114 and a display screen 116, such as a video display screen disposed at or in or near the interior rearview mirror assembly 118 of the vehicle 112 or elsewhere in the vehicle, or such as a navigation screen or the like at the mirror assembly or elsewhere in the vehicle, such as a navigation screen at the instrument panel or at a console of the vehicle. As shown in FIG. 9, the camera module 114 includes camera circuitry 120 (including an array photosensing pixels and a lens or optics for capturing image data in the field of view of the camera) and a wireless communication device 122, such as a radio frequency identification chip or element or device (RFID). The camera circuitry 120 is electrically connected to a connector 124 that includes a ground, video minus and video shield pin (Video GND), a power pin (Vcc) and a video plus pin (Video+). The wireless communication device 122 provides two-way wireless communication (such as radio frequency or infrared or the like) between the camera circuitry 120 and a programming device or reader device 126 to provide for camera identification and/or camera programming and/or the like without the need for a separate communication port or pin at the camera module, as discussed below.

The present invention thus may reduce the wire harness pigtail cost or connector pin cost to the camera module by reducing the number of pins which exist at the camera connector. The camera module of the present invention is suited for ReversAID™ (RA) cameras and the like, which do not require an optional communication line (such as for communication with a LIN or CAN vehicle communication network or the like), but still require a connection or pin or line so camera programming can be completed. Typically, if programming changes are desired to be made to a camera (such as to correct the camera's operation or to adjust a setting to better accommodate the vehicle display settings or the like), such as at the vehicle assembly plant or the like, electrical connection is made to the communication pin of the camera. Typically, such programming/communication is made via a separate communication pin at the camera module. The camera module of the present invention obviates the separate communication pin by providing the wireless communication device or RFID chip at the camera module so as to wirelessly communicate with the programming device or reader device to make the desired adjustments to the camera's operation.

The OEMs currently require any product being made for an automotive vehicle to have some method of keeping the part as it is assembled in the plant prior to shipment to the OEM for assembly into the vehicle. If an issue occurs with the assembled part, then the OEM has the ability to track the part back through the assembly process to build and programming information. Typically, this can be done by tracking part numbers and labels on the packaging or on the camera module at the vehicle assembly plant, which can be time consuming and costly. The camera module and RFID chip assembly of the present invention provides for easier tracking and identification of the camera modules, and can be done wirelessly, and thus may reduce the overall tracking costs for the cameras at the assembly plants (such as the costs associated with tracking stickers, labels, markings and the like at the camera module and/or packaging).

The present invention uses RFID tag electronics to program camera information (such as a serial number, date code, settings, special features and/or the like) into the camera circuitry via a wireless interface. For example, current ReversAID™ (RA) cameras are welded/glued/screwed together during final assembly. Once assembled, final camera programming information cannot be communicated with the camera without a programming interface. With conventional camera modules that include the communication pin, such programming is made via making electrical connection with the pin or port of each camera module individually, which may be time consuming and costly. With the RFID tag electronic interface of the camera module of the present invention, such external program line/wire/pins in a connector or lines are not needed or obviated to get programming into the camera, and the programming can be made via the wireless communication to one or several camera modules, thus saving time and costs in camera programming and/or in making camera programming adjustments. The camera module of the present invention is suited for any reverse aid type cameras or backup assist type cameras and would work well for such RA cameras having static overlays or not having any overlay.

Thus, for example, for a camera module with RFID tag electronics and built-in communication interface (such as I2C or SPI or the like), information could be communicated into the camera circuitry over the RFID. For example, camera settings, overlay information, alignment, date code information, serial number, OEM part number and/or the like all could be wirelessly communicated into and/or read from the camera module. Optionally, the RFID tag electronics may have the capability to store the part number and build date information of the camera module, and a tag reader could be used to read out this information for the camera or circuitry or printed circuit board (PCB) at any time during the manufacturing process. The OEM may also use the RFID chip communicator to wirelessly read camera information and wirelessly upload such read information into the OEM database as well.

As shown in FIG. 9, the RFID chip 122 may include RFID tag electronics or circuitry 122a that is in communication with an antenna 122b (which may be incorporated in the circuit board of the camera or may be a standalone antenna at the camera module). The transponder antenna may receive information or signals (such as radio frequency signals) from the reader system 126 (which may include a reader antenna 126a), and may communicate signals to the reader antenna and system or device 126. The RFID chip 122 is in communication with the camera circuitry via lines 128 (such as I2C lines or the like), and the RFID chip 122 provides a wireless interface between the reader or programming device and the camera circuitry, thereby obviating the need for additional pins or connectors at the camera module and manual or hard wire connection of the reader device to the camera module for programming the camera or adjusting the camera settings or the like.

Thus, the present invention provides a low cost camera module with only a 3 or 4 wire interface, and with a wireless communication chip that allows for reading and programming of various camera information and parameters, without requiring manual connection of wires to the camera module. For example, a small antenna may be placed on the PCB or in the PCB, and the RFID tag electronics may be attached to the antenna. When an external RF signal specific to the RFID tag is transmitted, the RFID powers and reads the information or transmits information back to the transmitter/receiver via the wireless interface. Optionally, it is envisioned that this same or similar type of wireless interface may also or otherwise be applied to body control modules and the like.

Current camera designs have six I/O lines used for interfacing to the vehicle head unit display and power lines. In contrast, the camera module of the present invention utilizes only three I/O pins for cameras that have no communication bus connection and only four I/O pins for cameras with a communication bus connection.

Optionally, the camera module may include a communication pin. Currently all cameras require a communication line for programming, imager settings, configuration, serial number, platform number, overlay information, alignment, final function test and the like. The camera module of the present invention may allow the communication line to be removed and the camera pin configuration to be only a 3 wire interface (such as a Vcc pin, a Video+pin and a Video GND pin as shown in FIG. 9). Thus, the electrical connector (such as a plug and socket type multi-pin connector) of the camera module comprises no more than three connecting pins for connecting to no more than three wires at the vehicle when the camera module is normally mounted at the vehicle. For applications where the camera module may include the optional communication pin (such as for connecting to a LIN or CAN bus of the vehicle), the electrical connector of the camera module comprises no more than four connecting pins for connecting to no more than four wires at the vehicle when the camera module is normally mounted at the vehicle. Optionally, for example, in case of differential video, the camera module may include a fourth pin or a "Video−" pin (such as shown in FIG. 9), with the line or pin referenced as "Video GND" in FIG. 9 provided as a power minus line or pin in such a four wire or four pin connector system.

Optionally, the camera and RFID chip module or assembly of the present invention may also eliminate the need for labels on the camera modules and/or packaging. The RFID chip could be used to store all of the part number information, date codes, platform information, and the like, and the OEM or Tier 1 supplier could read all this information as the part enters into their assembly area. The reader system and/or programming device may be operable to communicate with multiple cameras at the same time via wireless interface with multiple respective RFID chips at the camera modules.

The present invention thus provides a vehicular camera for a vision display system for a vehicle, such as a rearward facing camera for a rear backup assist system of the vehicle. The camera includes a wireless communication device or receiver or transceiver, such as a radio frequency identification (RFID) chip or device or the like.

For example, and according to an aspect of the present invention, a vision system for a vehicle includes a camera module disposed at the vehicle and having an exterior field of view. The camera module comprises camera circuitry and an electrical connector for connecting to a video line of the vehicle. The camera module includes a radio frequency identification element that is operable to wirelessly communicate with a remote device and to communicate with the camera circuitry to provide a wireless interface between the remote device and the camera circuitry. The vision system is operable to at least one of (a) identify the camera module via the wireless communication, and (b) program the camera circuitry via the wireless communication.

Optionally, the vision system may be operable to (a) identify the camera module via the wireless communication, and (b) program the camera circuitry via the wireless communication. The remote device may communicate at least one of (i) camera settings, (ii) overlay information and (iii) alignment information to the radio frequency identification element via the wireless communication and the radio frequency identification element may communicate the at least one of (i) camera settings, (ii) overlay information and (iii) alignment information to the camera circuitry. The radio frequency identification element may be operable to communicate at least one of (i) camera date code information, (ii) a camera serial number and (iii) an OEM part number to the remote device via the wireless communication. Optionally, the electrical connector may comprise no more than three connecting pins for connecting to no more than three wires at the vehicle when the camera module is normally mounted at the vehicle.

The vision system includes a display screen that is in communication with the video line and that is operable to display images captured by the camera module. The display screen may be disposed in an interior rearview mirror assembly of the vehicle, and may comprise a video mirror display screen, with video information displayed by the display screen being viewable through a transflective mirror reflector of the mirror reflective element of the interior rearview mirror assembly of the vehicle.

The camera module may be disposed at a rearward portion of the vehicle and may have a rearward facing field of view. The display screen may be operable to display images captured by the rearward viewing camera during a reversing maneuver of the vehicle.

Thus, the present invention provides a low cost camera module that provides for enhanced communication for programming and/or tracking of the camera module either at the camera module assembly plant, during shipping of the camera module to a vehicle assembly plant, at the vehicle assembly plant and/or in the assembled vehicle. The camera module of the present invention is suitable for use as a reverse aid camera module that may be disposed at a rear portion of the vehicle so as to have a generally rearwardly facing field of view behind the vehicle. The image data captured by the camera is communicated to an image processor and displayed at a display screen, such as a video display screen, in the vehicle and viewable by the driver of the vehicle during normal operation of the vehicle, such as during a reversing maneuver of the vehicle. For example, video images of the scene occurring rearwardly of the vehicle may be displayed at a video display screen at or in or near an interior rearview mirror assembly of the vehicle for viewing by the driver of the vehicle during a reversing maneuver.

Optionally, the video display may display other images, and may display a surround view or bird's-eye view or panoramic-view images or representations at the display screen, such as by utilizing aspects of the display systems described in PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, which are hereby incorporated herein by reference in their entireties. Examples of bird's eye view systems and associated techniques are described in U.S. Pat. Nos. 5,670,935; 6,636,258; 7,145,519; 7,161,616; 7,230,640; 7,248,283; 7,295,229; 7,301,466; and/or 7,592,928, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, which are hereby incorporated herein by reference in their entireties. Optionally, the camera and video display may operate to display other images, and may display a trailer angle or the like of a trailer behind the vehicle.

The vision display system may operate to display the rearward images at the video mirror display, and may do so responsive to the driver of the vehicle shifting the vehicle into a reverse gear (such as by utilizing aspects of the vision systems described in U.S. Pat. Nos. 5,550,677; 5,670,935; 6,498,620; 6,222,447; and/or 5,949,331, and/or PCT Application No. PCT/US2011/056295, filed Oct. 14, 2011 and published Apr. 19, 2012 as International Publication No. WO 2012/051500, which are hereby incorporated herein by reference in their entireties).

As discussed above, the video display screen may be incorporated in or at an interior rearview mirror assembly of the vehicle. The interior rearview mirror assembly may be mounted at the vehicle via any suitable mounting assembly attached to an interior portion of the vehicle, such as to an in-cabin surface of a vehicle windshield (such as to a mounting button or attachment element adhered to the interior surface of the vehicle windshield). The mirror assembly may be mounted at or attached to an interior portion of the vehicle (such as to a mounting button or the like at an interior surface of the vehicle windshield or the like) via any mounting means, such as a single ball or single pivot mounting arrangement, or a double ball or double pivot mirror mounting arrangement. Examples of double pivot or double ball mounting arrangements are described in commonly assigned U.S. Pat. Nos. 4,646,210 and 6,331,066, which are hereby incorporated herein by reference in their entireties. The mounting assembly may be mounted to a mounting button or attachment element at the vehicle windshield via a breakaway mounting construction, such as by utilizing aspects of the mounting constructions described in U.S. Pat. Nos. 6,774,810; 6,642,851; 6,483,438; 6,366,213; 6,326,900; 6,222,460; 6,172,613; 6,087,953; 5,820,097; 5,377,949; 5,330,149 and/or 5,100,095, which are hereby incorporated herein by reference in their entireties. The mounting assembly may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005 and published Mar. 23, 2006 as U.S. Publication No. US-2006-0061008; and/or Ser. No. 12/912,253, filed Oct. 26, 2010, now U.S. Pat. No. 8,851,690, and/or International Publication No. WO 2010/111173, published Sep. 30, 2010, which are hereby incorporated herein by reference in their entireties). Optionally, the mirror assembly may incorporate a mounting arrangement of the types described in U.S. Pat. Nos. 7,289,037; 7,249,860; and/or 7,448,589, and/or U.S. patent application Ser. No. 10/522,446, filed Jan. 19, 2005 and published Nov. 10, 2005 as U.S. Patent Publication No. 2005-0248168, which are hereby incorporated herein by reference in their entireties.

The video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,626,749; 7,581,859; 7,446,650; 7,370,983; 7,855,755; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display or displays may comprise a video display and may utilize aspects of the video display devices or modules described in U.S. Pat. Nos. 6,690,268; 7,184,190; 7,274,501; 7,370,983; and/or 7,446,650, and/or U.S. patent application Ser. No. 12/091,525, filed Apr. 25, 2008, now U.S. Pat. No. 7,855,755; and/or Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or U.S. Pat. Nos. 7,965,336 and 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

For rear backup assist systems, various types of cameras and/or video displays may be utilized. Typically, rear backup cameras comprise color video cameras and the video display device displays color video images for viewing by the driver of the vehicle. Such color cameras comprise RCB filters (or other color filtering means), and may use a separate near infrared filter, to cause the camera to capture color images, while reducing blooming/pixel saturation due to near infrared radiation from ambient lighting and/or from the rear backup lighting of the vehicle and/or other lights present and operated when the reverse gear of the vehicle is selected. Also, the color filter and especially any near infrared filtering provided for a color rear video camera substantially impacts and reduces the camera's low level light sensitivity. This is especially so for CMOS cameras, such as described in U.S. Pat. Nos. 5,550,677; 5,877,897; and/or 5,796,094, which are hereby incorporated herein by reference in their entireties.

By dispensing with the color and near infrared filters at the camera, the full near infrared sensitivity of the CMOS imager or photosensor array may be harnessed/utilized. Thus, the camera may view or see in the near infrared range (typically light or energy that has a wavelength between about 750 nm and about 2,500 nm or thereabouts). For example, an imager comprising an array of photosensors formed by complementary-metal-oxide-semiconductor (CMOS) technology on a semiconductor substrate can have sensitivity to near infrared radiation out to around about 1,200 nm or thereabouts. This is especially beneficial because when the reversing light comes on, such lights are rich in visible light and also in near infrared light or energy, so by not including the color and near infrared filters at the camera, the performance of the camera is substantially enhanced in such low ambient lighting conditions. Such a camera not only provides enhanced performance in lower ambient lighting conditions, but does so with a reduced cost camera.

Also, in the likes of commercially available video mirrors supplied for vehicles today, the LCD video screen of the video display device used has RGB filters or color mosaic pattern filters associated with the likes of individually addressable pixels of the multi-pixel/reconfigurable liquid crystal display screen, and with the screen backlit by a plurality of light emitting light sources (such as white light emitting light emitting diodes or the like) operable, when powered, to generate a backlighting intensity to the rear of the video screen employed of at least about 30,000 candelas/m2 (such as by utilizing aspects of the display systems described in U.S. Pat. No. 7,855,755, which is hereby incorporated herein by reference in its entirety) so as to provide a display intensity of video images and other information displayed to and viewed by the driver of the vehicle through the transflective mirror reflector of the likes of an electrochromic interior rearview mirror reflective element utilized of at least about 400 cd/m2 as viewed by the driver normally operating the vehicle equipped with the display system. Thus, the provision of color video display for viewing by the driver of the vehicle comes at the price of lower light transmission for backlighting through the color mask or filter of the display screen and, thus, requires a high level of backlighting intensity to provide the desired display intensity for all viewing conditions, including higher ambient lighting conditions, such as a sunny day, and such a high level of backlighting intensity is especially required or desired when the video screen is viewed through a transflective reflector of a video mirror assembly, such as described in U.S. Pat. Nos. 6,690,268; 7,184,190; 7,274,501; 7,370,983; 7,446,650; and/or 7,855,755, which are hereby incorporated herein by reference in their entireties. Thus, the provision of color video display adds cost and complexity to the vision system, and requires powerful backlighting and color filtering (and optionally near infrared filtering and the like).

For a color video display screen, the color filter or mask at the display screen attenuates or reduces light transmission through the display screen by a factor of between about two and three or thereabouts (and could reduce transmission by more or less depending on the particular application), and thus the color filters or masks reduce the backlighting that passes through the display screen for viewing by the driver of the vehicle. Thus, with the color filter or mask removed, the display device may provide comparable display intensity with only about one-half as many to about two-thirds as many backlighting light emitting diodes, and/or the backlighting light emitting diodes may individually operate at a lower intensity and/or electrical current. Thus, the un-filtered display screen may operate with a reduced number of backlighting light emitting diodes or at a reduced intensity, which results in reduced power consumption by the powered backlighting light emitting diodes and reduced heat generated by the powered backlighting light emitting diodes, which achieves a reduction in the cost to manufacture and operate the display screen.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the mirror assembly may include user inputs that may comprise buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 6,001,486; 6,310,611; 6,320,282; 6,627,918; 6,690,268; 7,224,324; 7,249,860; 7,253,723; 7,255,451; 7,360,932; and/or 7,446,924, and/or U.S. patent application Ser. No. 10/538,724, filed Jun. 13, 2005 and published Mar. 9, 2006 as U.S. Publication No. US-2006-0050018, and/or Ser. No. 12/576,550, filed Oct. 12, 2009, now U.S. Pat. No. 8,465,161, which are all hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322; and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; and/or 6,678,614, and/or U.S. patent application Ser. No. 10/538,724, filed Jun. 13, 2005 and published Mar. 9, 2006 as U.S. Publication No. US-2006-0050018, and/or U.S. patent application Ser. No. 10/529,715, filed Mar. 30, 2005, now U.S. Pat. No. 7,657,052, which are all hereby incorporated herein by reference in their entireties.

Optionally, the mirror assembly may include one or more other accessories at or within the mirror casing or otherwise associated with or near the mirror assembly, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093 and/or U.S. provisional application Ser. No. 61/785,565, filed May 15, 2009, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 6,243,003; 6,278,377; and/or 6,420,975; and/or U.S. patent application Ser. No. 10/529,715, filed Mar. 30, 2005, now U.S. Pat. No. 7,657,052, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot or object detection system, such as disclosed in U.S. Pat. Nos. 8,058,977; 7,720,580; 5,929,786; 5,786,772; 7,492,281; 7,038,577 and 6,882,287, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, and/or U.S. provisional application Ser. No. 61/785,565, filed May 15, 2009, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 6,690,268 and 6,847,487, and/or U.S. patent application Ser. No. 11/239,980, filed Sep. 30, 2005, now U.S. Pat. No. 7,881, 496; Ser. No. 11/105,757, filed Apr. 14, 2005, now U.S. Pat. No. 7,526,103; Ser. No. 12/578,732, filed Oct. 14, 2009 and published Apr. 22, 2010 as U.S. Publication No. US-2010-0097469; and/or Ser. No. 12/508,840, filed Jul. 24, 2009 and published Jan. 28, 2010 as U.S. Publication No. US-2010-0020170, an alert system, such as an alert system of the types described in PCT Application No. PCT/US2010/25545, filed Feb. 26, 2010, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or U.S. provisional application, Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442; and/or 5,632, 092, a control system, such as a control system of the types described in PCT Application No. PCT/US10/38477, filed Jun. 14, 2010 and published Dec. 16, 2010 as International Publication No. WO 2010/144900, and/or any other accessory or circuitry or the like (with the disclosures of the above-referenced patents and patent applications and provisional applications and PCT applications being hereby incorporated herein by reference in their entireties).

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention.

Optionally, a reflective element assembly of the present invention (such as for an interior or exterior rearview mirror assembly) may include a photo sensor or light sensor (such as the types described in U.S. Pat. Nos. 6,831,268; 6,742,904; 6,737,629; 5,406,414; 5,253,109; 4,799,768; 4,793,690; and/or 7,004,593, which are hereby incorporated herein by reference in their entireties) at the rear or fourth surface of the reflective element assembly, such that the photo sensor detects light passing through the reflective element assembly. Examples of such configurations are described in U.S. Pat. Nos. 4,793,690; 5,550,677; 5,193,029 and/or 7,004,593, which are all hereby incorporated herein by reference in their entireties. The reflective element assembly thus may have a window or transmissive port or portion at the photo sensor. The reflective element assembly may have a fixed attenuation such that only a relatively small amount of light passes therethrough, such as about 12 to 25 percent of the light incident on the reflective element assembly, such that the signal to dark current ratio generated at the sensor may be substantially reduced. Because the photo sensor may have a relatively small sensing area, the sensor may not receive or sense a substantial amount of light passing through the reflective element assembly. Therefore, it is envisioned that a light concentrator (such as a lens and/or light channel and/or light pipe and/or other light concentrating device) may be positioned at the photo sensor to focus or direct the light passing through a larger area of the reflective element assembly onto the smaller sensing area of the photo sensor.

Note that mirror cells or reflective element assemblies such as described herein can be included in complete mirror assemblies that include a variety of added-features, such as lighting, telematics functionality and electronics, such as are disclosed in U.S. Pat. Nos. 7,657,052; 7,308,341; 7,195,381; 7,167,796; 7,004,593; 6,690,268; 6,477,464; 6,472,979; 6,445,287; 6,420,975; 6,294,989; 6,278,377; 6,243,003; 6,042,253; 5,938,321; 5,924,212; 5,813,745; 5,820,245; 5,669,698; 5,673,994; 5,671,996; 5,649,756; 5,632,092; 5,255,442; 5,178,448; 5,131,154; 4,937,945; 4,862,594; 4,807,096; 4,733,336; and/or 4,646,210, which are all hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A camera assembly for a vehicle, the camera assembly comprising:

a housing, a lens and an imager;

wherein said imager is disposed in the housing and positioned for receiving images from the lens; and an end connector electrically connected to circuitry disposed in the housing, wherein the end connector comprises no more than four connection points, and wherein the connection points comprise (i) a first connection point that carries a video+signal, (ii) a second connection point that carries power, and (iii) a third connection point that (a) carries a video−signal, (b) comprises a video shield connection point and (c) comprises a ground connection point.

2. A camera assembly as claimed in claim 1, wherein the connection points of the end connector further includes a fourth connection point that carries a communication signal.

3. A camera assembly as claimed in claim 1, wherein a plurality of electrical conductors connect to the end connector, and wherein the electrical conductors include (i) a first electrical conductor that electrically connects to the first connection point of the end connector, (ii) a second electrical conductor that electrically connects to the second connection point of the end connector and (iii) a third electrical conductor that electrically connects to the third connection point of the end connector, and wherein the third electrical conductor is wrapped around the first and second electrical conductors.

4. A camera assembly as claimed in claim 3, wherein the third electrical conductor is in the form of a conductive foil.

5. A camera assembly as claimed in claim 3, further comprising an outer shield around the first, second and third electrical conductors, wherein the outer shield is sealed to the camera housing to prevent moisture from passing into the camera housing.

6. A camera assembly as claimed in claim 1, comprising a radio frequency identification element that is operable to wirelessly communicate with a remote device and to communicate with camera circuitry of the camera assembly to provide a wireless interface between the remote device and the camera circuitry, and wherein a control of a vision system of a vehicle equipped with the camera assembly is operable to at least one of (a) identify the camera assembly via the wireless communication and (b) program camera circuitry of the camera assembly via wireless communication.

7. The vision system of claim 1, wherein the end connector comprises no more than three connection points.

8. A camera system for a vehicle, the camera system comprising:
   a vehicle camera assembly, including a housing, a lens and an imager;
   wherein the imager is disposed in the housing and positioned for receiving images from the lens;
   an end connector electrically connected to circuitry disposed in the housing, wherein the end connector comprises no more than four connection points, and wherein the connection points comprise (i) a first connection point that carries a video+signal, (ii) a second connection point that carries power, and (iii) a third connection point that (a) carries a video–signal, (b) comprises a video shield connection point and (c) comprises a ground connection point; and
   a vehicle connector that connects to the end connector; and
   wherein the vehicle connector is electrically connected with (i) a first electrical conductor that connects electrically between the first connection point of the end connector and a display of the vehicle, (ii) a second electrical conductor that connects electrically between the second connection point of the end connector and a power source of the vehicle, and (iii) a third electrical conductor that connects between the third connection point of the end connector and a ground for the display of the vehicle, and wherein the third electrical conductor is wrapped around the first and second electrical conductors.

9. A camera system as claimed in claim 8, wherein the end connector further includes a fourth connection point that carries a communication signal.

10. A camera system as claimed in claim 8, wherein the third electrical conductor is in the form of a conductive foil.

11. A camera system as claimed in claim 8, wherein the camera assembly comprises a radio frequency identification element that is operable to wirelessly communicate with a remote device and to communicate with camera circuitry to provide a wireless interface between the remote device and the camera circuitry, and wherein a control of the camera system of a vehicle equipped with the camera assembly is operable to at least one of (a) identify the camera assembly via the wireless communication and (b) program camera circuitry of the camera assembly via wireless communication.

12. The vision system of claim 8, wherein the end connector comprises no more than three connection points.

13. A vision system for a vehicle, the vision system comprising:
   a camera module disposed at a vehicle equipped with the vision system and having an exterior field of view, the camera module comprising camera circuitry and an electrical connector;
   wherein the camera module includes a radio frequency identification element that is operable to wirelessly communicate with a remote device and to communicate with the camera circuitry to provide a wireless interface between the remote device and the camera circuitry;
   wherein the vision system is operable to at least one of (a) identify the camera module via wireless communication and (b) program camera circuitry via wireless communication; and
   wherein the electrical connector comprises (i) a first connection point that carries a video+signal, (ii) a second connection point that carries power, and (iii) a third connection point that (a) carries a video–signal, (b) comprises a video shield connection point and (c) comprises a ground connection point.

14. The vision system of claim 13, wherein the vision system is operable to (a) identify the camera module via wireless communication and (b) program camera circuitry via wireless communication.

15. The vision system of claim 14, wherein the remote device is operable to communicate at least one of (i) camera settings, (ii) overlay information and (iii) alignment information to the radio frequency identification element via wireless communication, and wherein the radio frequency identification element communicates the at least one of (i) camera settings, (ii) overlay information and (iii) alignment information to the camera circuitry.

16. The vision system of claim 14, wherein the radio frequency identification element is operable to communicate at least one of (i) camera date code information, (ii) a camera serial number and (iii) an OEM part number to the remote device via wireless communication.

17. The vision system of claim 13, further comprising a display screen operable to display images captured by the camera module.

18. The vision system of claim 13, wherein the electrical connector comprises no more than four connection points.

19. The vision system of claim 18, wherein the connection points of the electrical connector further includes a fourth connection point that carries a communication signal.

* * * * *